Patented June 19, 1923.

1,459,410

UNITED STATES PATENT OFFICE.

ROBERT C. MORAN, OF RIDLEY PARK, PENNSYLVANIA, ASSIGNOR TO E. I. DU PONT DE NEMOURS & COMPANY, OF WILMINGTON, DELAWARE, A CORPORATION OF DELAWARE.

RECOVERY OF BY-PRODUCTS IN MERCURY FULMINATE MANUFACTURE.

No Drawing.   Application filed June 17, 1920.   Serial No. 389,729.

*To all whom it may concern:*

Be it known that I, ROBERT C. MORAN, a citizen of the United States, and a resident of Ridley Park, in the county of Delaware and State of Pennsylvania, have invented a certain new and useful Recovery of By-Products in Mercury Fulminate Manufacture, of which the following is a specification.

This invention relates to the recovery of by-products, chiefly nitrites, formates, and ethyl alcohol, from the liquor obtained by the condensation of the vapors evolved in the manufacture of mercury fulminate, $(C:N.O)_2Hg$.

In the manufacture of fulminate of mercury by the interaction of alcohol, nitric acid and mercury, a vigorous reaction takes place during the course of which there is evolved a quantity of vapors equivalent in weight to approximately one-half of that of the raw materials used. When efficiently condensed, these vapors yield a liquor (which will be designated condensate hereinafter) of the following approximate composition: 35% ethyl nitrite, 16% ethyl formate, 30% ethyl alcohol, 10% water, 5% aldehyde; the remainder being made up of ethyl acetate, ethyl nitrate, nitric and nitrous acids, etc. This condensate tends to separate into two layers, the lower one being chiefly composed of water.

The complex character of the above-described mixture would indicate that the separation of the several constituents could be effected, if at all, only after the determination of very precise conditions of treatment. Heretofore the only constituent of this mixture which has been recovered is the alcohol.

In my application Serial No. 386337 filed June 3, 1920, I have set forth a process of recovering several by-products from the above described condensate, said process, briefly stated, consisting in separating the ethyl nitrite from the rest of the condensate by a carefully controlled distillation, then hydrolyzing separately the ethyl nitrite in the distillate and the ethyl formate in the residue, and finally separating by distillation the ethyl alcohol thus formed.

On further investigation, I have now discovered that the recovery of nitrite, formate, and alcohol, both free and combined, can be made from the condensate by a simpler procedure, and one requiring much less time, manipulation, etc., than that described in my above mentioned application. This improved procedure consists essentially in treating the condensate with an alkali-forming metal hydroxide, while cooling it, (preferably to below 20° C.), to saponify the ethyl formate; separating by decantation the resulting ethyl nitrite-alcohol layer from the water layer containing the formate of the alkali-forming metal; then hydrolyzing the ethyl-nitrite by heating the ethyl nitrite-alcohol mixture in the presence of water and an alkali-forming metal hydroxide, preferably at a temperature above 70° C.; and finally separating the alcohol from the resulting metal nitrite and from at least a large proportion of the water by distillation.

It is desirable to add sufficient hydroxide, preferably an alkali-metal hydroxide, to convert all of the ethyl nitrite present to a metal nitrite and ethyl alcohol. A 30% aqueous sodium hydroxide solution is a convenient form in which to add the hydroxide to the ethyl nitrite-alcohol mixture.

My invention may be illustrated by the following example:—

To 75 lbs. of condensate in a closed high-pressure autoclave which is jacketed for brine-cooling and steam-heating and is provided with agitation apparatus, is added 12 lbs. of alcohol in order to obtain a homogeneous solution by the elimination of the water layer usually present in the condensate. Under brine-cooling and agitation, the requisite amount (about 30 lbs.) of a 30% aqueous solution of sodium hydroxide, to saponify the ethyl formate and render the solution neutral, is added to the condensate charge by means of an under-surface feed at such a rate that the temperature of the reaction mixture does not exceed 15° C. (59° F.). (The requisite amount of sodium hydroxide may be determined by a titration in the cold of a sample of the homogeneous condensate with standard alkali.) The sodium hydroxide is used in the form of a concentrated aqueous solution in order that aqueous solution of sodium formate subsequently formed in the reaction mixture shall be of such concentration as to reduce to a minimum the solubility value of alcohol therein.

After the complete addition of the concentrated aqueous caustic solution, which usually requires about one hour with efficient brine-cooling, the agitation is stopped to allow the reaction mixture to separate into a lower layer of aqueous sodium formate containing a negligible amount of alcohol and an upper layer of alcohol and ethyl nitrite.

The lower aqueous sodium formate layer is removed by gravity, filtered and evaporated to dryness. The crude product analyzes about 70–75% actual sodium formate. The crude product amounts to about 14 lbs.

The ethyl nitrite content of the alcoholic-ethyl nitrite solution remaining in the autoclave is then determined. 7 lbs. of water is then added to the autoclave charge so that, following the addition of the requisite amount of a 30% aqueous sodium hydroxide solution in order to saponify the ethyl nitrite, a homogeneous reaction solution will be obtained.

The saponification is then carried out by gradually raising the temperature of the autoclave charge to about 100° C. (212° F.), corresponding to a pressure of about 65 lbs. per sq. in. Within two hours the saponification is completed under these conditions. The time required for the saponification may be reduced by maintaining a higher temperature and pressure.

The alcohol is then distilled directly from the autoclave using a dephlegmator so as to return the water to the autoclave. The resulting distillate comprises the alcohol originally present in the condensate together with that formed by the saponification of the ethyl formate and the ethyl nitrite. A yield of about 41 lbs. of alcohol of 90% strength by weight may be readily obtained.

Following the distillation of the alcohol there is sufficient water present in the autoclave to completely dissolve the sodium nitrite product. The sodium nitrite solution is drawn off, filtered and evaporated to dryness. The crude sodium nitrite product, amounting to about 21 lbs., analyzes 70–80% actual sodium nitrite.

Although my new process has been described above in great detail, it will be understood that the conditions of operation and the proportions of reagents may be varied considerably without departing from the spirit and scope of my invention.

I claim:—

1. The process of recovering valuable products from a mixture containing ethyl nitrite, ethyl formate, ethyl alcohol, and water, which comprises saponifying the ethyl formate at a temperature sufficiently low to avoid substantial hydrolysis of ethyl nitrite, separating the resulting metal formate from the alcohol and the ethyl nitrite, and then heating the ethyl nitrite in the presence of alcohol and a hydrolyzing agent until the hydrolysis of the ethyl nitrite is substantially complete.

2. The process of recovering valuable products from a mixture containing ethyl nitrite, ethyl formate, ethyl alcohol, and water, which comprises saponifying the ethyl formate while cooling the solution, separating the resulting metal formate in the form of a water solution from the alcohol and the ethyl nitrite, then heating the ethyl nitrite mixed with the alcohol and with an aqueous alkali-forming metal hydroxide solution until hydrolysis is substantially complete, and separating the alcohol in the resulting mixture from metal nitrite and water by distillation.

3. The process of recovering valuable products from a mixture containing ethyl nitrite, ethyl formate, ethyl alcohol, and water, which comprises adding an aqueous alkali-metal hydroxide solution to the mixture to saponify the ethyl formate, while maintaining the mixture at a temperature sufficiently low to avoid substantial hydrolysis of ethyl nitrite, allowing the mass to segregate into two layers, one composed mainly of alkali-metal formate and water, and the other of ethyl nitrite and alcohol, separating said layers, and treating the ethyl nitrite-alcohol mixture with a hydrolyzing agent at a high temperature until hydrolysis of the ethyl nitrite is effected.

4. The process of recovering valuable products from a mixture containing ethyl nitrite, ethyl formate, ethyl alcohol, and water, which comprises adding an aqueous alkali-metal hydroxide solution to the mixture to saponify the ethyl formate, while maintaining the mixture at a temperature sufficiently low to avoid substantial hydrolysis of ethyl nitrite, allowing the mass to segregate into two layers, one composed mainly of alkali-metal formate and water, and the other of ethyl nitrite and alcohol, separating said layers, and heating the ethyl nitrite-alcohol mixture with an aqueous solution of an alkali-metal hydroxide at a temperature above 70° C. to hydrolyze the ethyl nitrite.

5. The process of recovering valuable products from a mixture containing ethyl nitrite, ethyl formate, ethyl alcohol, and water, which comprises adding an aqueous alkali-metal hydroxide solution to the mixture to saponify the ethyl formate, while maintaining the mixture at a temperature sufficiently low to avoid substantial hydrolysis of ethyl nitrite, allowing the mass to segregate into two layers, one composed mainly of alkali-metal formate and water, and the other of ethyl nitrite and alcohol, separating said layers, and heating the ethyl nitrite-alcohol mixture with an aqueous alkali-metal hydroxide solution at a temperature of about 100° C. and under pressure until hydrolysis of the ethyl nitrite is substantially complete.

6. The process of recovering valuable products from a mixture containing ethyl nitrite, ethyl formate, ethyl alcohol, and water, which comprises adding sufficient alcohol to said mixture to prevent formation of a water layer, gradually adding an aqueous sodium hyroxide solution to the mixture while agitating it and while maintaining it at a temperature not exceeding 15° C., until the ethyl formate has been converted into ethyl alcohol and sodium formate, allowing the reaction mixture to separate into a lower layer of water and sodium formate, and an upper layer of alcohol and ethyl nitrite, removing the lower layer, adding an aqueous sodium hydroxide solution to the alcohol and ethyl nitrite, heating the resulting mixture under pressure to a temperature above 70° C. until the ethyl nitrite is hydrolyzed, and then separating the alcohol from water and sodium nitrite by distillation.

7. In the process of recovering valuable products from a mixture composed mainly of ethyl nitrite, ethyl formate, ethyl alcohol, and water, the steps which comprise saponifying the ethyl formate at a temperature sufficiently low to avoid substantial hydrolysis of ethyl nitrite, and then separating the resulting metal formate in the form of a water solution by decantation.

8. In the process of recovering valuable products from a mixture composed mainly of ethyl nitrite, ethyl formate, ethyl alcohol, and water, the steps which comprise saponifying the ethyl formate at a temperature sufficiently low to avoid substantial hydrolysis of ethyl nitrite, separating the resulting metal formate in the form of a water solution by decantation, and then heating the remaining alcohol and ethyl nitrite with an aqueous alkali-forming metal hydroxide solution at a high temperature to hydrolyze the ethyl nitrite.

9. The process of treating the liquor, containing ethyl formate, ethyl nitrite, and alcohol, obtained by condensation of vapors evolved in the ordinary manufacture of mercury fulminate, which comprises subjecting said liquor to the action of an alkali-forming metal hydroxide until the ethyl formate is saponified, while maintaining the temperature below 20° C. to avoid substantial hydrolysis of ethyl nitrite.

10. The process of treating the liquor, containing ethyl formate, ethyl nitrite, and alcohol, obtained by condensation of vapors evolved in the ordinary manufacture of mercury fulminate, which comprises gradually adding to said liquor, while stirring and cooling the same to a temperature substantially below 70° C., sufficient alkali-metal hydroxide solution to saponify the ethyl formate, allowing the mixture to separate into two layers, and then removing one layer from the other.

In testimony whereof I affix my signature.

ROBERT C. MORAN.